(12) United States Patent
Akiba

(10) Patent No.: US 11,869,393 B2
(45) Date of Patent: Jan. 9, 2024

(54) CIRCUIT DEVICE AND HEAD-UP DISPLAY

(71) Applicant: SEIKO EPSON CORPORATION, Tokyo (JP)

(72) Inventor: Yasutoshi Akiba, Chino (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 18/160,558

(22) Filed: Jan. 27, 2023

(65) Prior Publication Data

US 2023/0274712 A1    Aug. 31, 2023

(30) Foreign Application Priority Data

Jan. 28, 2022    (JP) ................................ 2022-011513

(51) Int. Cl.
| | | |
|---|---|---|
| *G09G 3/34* | (2006.01) | |
| *G09G 3/36* | (2006.01) | |
| *G06T 5/00* | (2006.01) | |

(52) U.S. Cl.
CPC ........... *G09G 3/3426* (2013.01); *G06T 5/006* (2013.01); *G09G 3/36* (2013.01); *G09G 2320/0626* (2013.01); *G09G 2320/0666* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 2006/0039017 A1* | 2/2006 | Park .......................... | H04N 9/73 358/1.9 |
| 2011/0019876 A1* | 1/2011 | Galoppo ................... | G06T 7/30 382/294 |
| 2011/0175925 A1* | 7/2011 | Kane ....................... | G01J 1/4204 345/589 |
| 2012/0212467 A1* | 8/2012 | Kohtoku ............... | G02F 1/1354 345/207 |
| 2014/0028699 A1* | 1/2014 | Kurtz ................... | H04N 9/3182 345/590 |
| 2014/0333649 A1* | 11/2014 | Tatsumi .................. | G06T 5/009 345/589 |
| 2015/0243250 A1 | 8/2015 | Fukuda | |
| 2017/0131765 A1* | 5/2017 | Perek ..................... | G06F 3/0304 |
| 2018/0130197 A1* | 5/2018 | Weiss ................... | H04N 9/8205 |
| 2019/0156086 A1* | 5/2019 | Plummer ............... | H04N 23/80 |

(Continued)

FOREIGN PATENT DOCUMENTS

| | | |
|---|---|---|
| JP | 2001-117071 A | 4/2001 |
| JP | 2015-158636 A | 9/2015 |
| JP | 2020-101784 A | 7/2020 |

*Primary Examiner* — Fred Tzeng
(74) *Attorney, Agent, or Firm* — Harness, Dickey & Pierce, P.L.C.

(57) ABSTRACT

Provided is a circuit device used in a display device of a head-up display that performs image projection using display image data and a light source. The circuit device includes: a dimming control circuit configured to perform dimming control of the light source based on image data; a color correction circuit configured to perform color correction on the image data in accordance with a result of the dimming control to output the display image data; and a blinding error detection circuit configured to perform a blinding error detection process of the head-up display in accordance with the display image data and the result of the dimming control.

10 Claims, 13 Drawing Sheets

(56) References Cited

U.S. PATENT DOCUMENTS

2020/0201035 A1   6/2020  Anand et al.
2021/0158069 A1*  5/2021  Kim .................... G06V 10/147
2022/0114928 A1*  4/2022  Atkins .................. G02B 5/208

* cited by examiner

US 11,869,393 B2

CIRCUIT DEVICE AND HEAD-UP DISPLAY

The present application is based on, and claims priority from JP Application Serial Number 2022-011513, filed Jan. 28, 2022, the disclosure of which is hereby incorporated by reference herein in its entirety.

BACKGROUND

1. Technical Field

The present disclosure relates to a circuit device, a head-up display, and the like.

2. Related Art

JP-A-2020-101784 discloses a circuit device used for a head-up display. In this circuit device, when a glare index value obtained from display image data of the head-up display exceeds a threshold value, an occurrence of a glare error is detected. On the other hand, in a display device, color correction may be performed on image data, and display image data after being subjected to the color correction may be displayed. For example, JP-A-2001-117071 discloses a display device for a vehicle that corrects image data to a color tone that cancels a change in color tone when a color tone of a backlight changes.

In JP-A-2020-101784, a blinding error is detected, which is detection of the glare error performed on the display image data output to the head-up display. However, when the color correction of the display image data is performed in accordance with dimming control of a light source, if the blinding error is detected based on the display image data after being subjected to the color correction, there is a possibility that the error cannot be appropriately detected.

SUMMARY

An aspect of the present disclosure relates to a circuit device used in a display device of a head-up display that performs image projection using display image data and a light source. The circuit device includes: a dimming control circuit configured to perform dimming control of the light source based on image data; a color correction circuit configured to perform color correction on the image data in accordance with a result of the dimming control to output the display image data; and a blinding error detection circuit configured to perform a blinding error detection process of the head-up display in accordance with the display image data and the result of the dimming control.

Another aspect of the present disclosure relates to a head-up display including the circuit device described above and the display device configured to project a display image based on the display image data from the circuit device.

DESCRIPTION OF EXEMPLARY EMBODIMENTS

Hereinafter, a preferred embodiment according to the present disclosure will be described in detail. The present embodiment to be described below does not unduly limit contents described in the claims, and not all configurations described in the present embodiment are necessarily essential constituent elements.

1. Circuit Device

Figure 1:
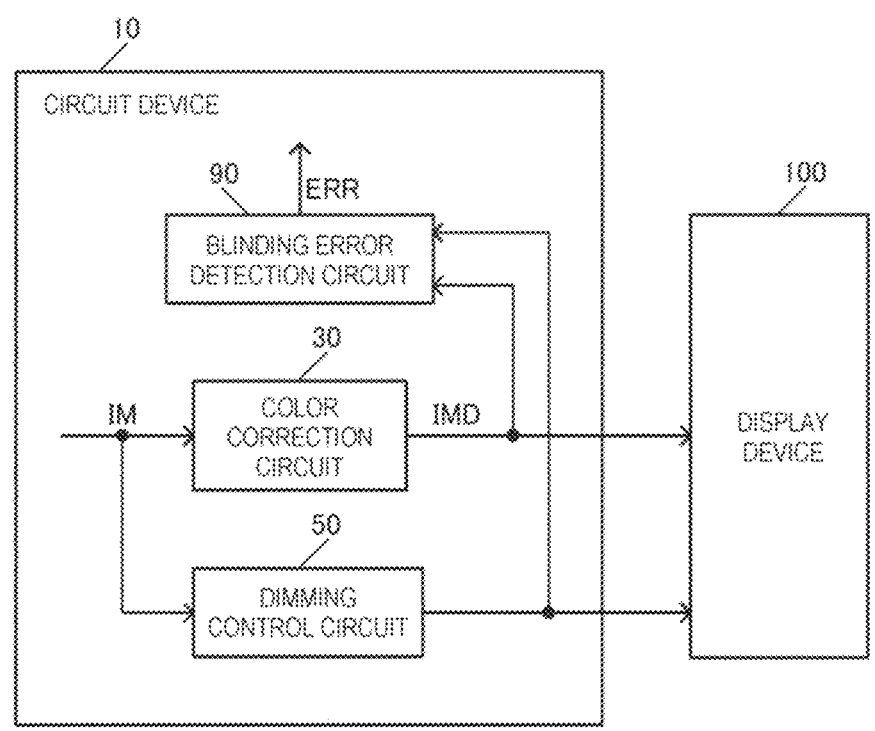
FIG. 1 shows a configuration example of a circuit device according to an embodiment.

FIG. 1 shows a configuration example of a circuit device 10 according to the present embodiment. The circuit device 10 includes a color correction circuit 30, a dimming control circuit 50, and a blinding error detection circuit 90.

The circuit device 10 is, for example, an integrated circuit device in which a plurality of circuit elements are integrated on a semiconductor substrate. A display device 100 displays an image based on display image data IMD from the circuit device 10. Specifically, the display device 100 is a display device of a head-up display that performs image projection using the display image data IMD and a light source. For example, the display device 100 is a device for displaying a virtual image in a field of view of a user. The display device 100 includes a display panel, a display driver, or the like. The display device 100 may further include a light source device such as a backlight. The circuit device 10 according to the present embodiment is a circuit device used for such a display device of a head-up display.

The color correction circuit 30 performs color correction on image data IM and outputs the display image data IMD to the display device 100. That is, the color correction circuit 30 performs the color correction on the image data IM and outputs the image data IM subjected to the color correction to the display device 100 as the display image data IMD. Specifically, the color correction circuit 30 outputs the display image data IMD by performing the color correction on the image data IM in accordance with a result of dimming control. The color correction is, for example, a color adjustment process of the image data IM, and is a correction process of adjusting a color level. The color correction may also be referred to as luminance correction or gradation correction of the image data IM.

The dimming control circuit 50 performs the dimming control of the light source based on the image data IM. The dimming control is control for adjusting a light amount of the light source device such as the backlight. The dimming control may be dimming control of local dimming under which brightness of the light source device such as the backlight is controlled for each of a plurality of areas, or may be dimming control under which brightness of an entire display screen is globally controlled.

As described above, when the display image data IMD is displayed on the display device 100 and the dimming control is performed by the dimming control circuit 50, the color correction circuit 30 performs the color correction on the image data IM in accordance with a dimming amount under the dimming control. Under the dimming control, in order to reduce power consumption of the light source device and to make black pixels appear blacker, control for decreasing the light amount of the light source of the light source device is performed. In this case, the color correction circuit 30 performs the color correction to increase a luminance of a pixel corresponding to the light source on a display screen of the display device 100 by an amount corresponding to the decrease in light amount of the light source. For example, the color correction circuit 30 performs the color correction on each pixel value of the image data IM, so that the image displayed on the display device 100 based on the display image data IMD has the same brightness and hue as an image of the image data IM, and outputs the image data IM subjected to the color correction to the display device 100 as the display image data IMD. The color correction circuit 30 may perform the color correction for adjusting the hue or the like of the image displayed on the display device 100.

The blinding error detection circuit 90 performs a blinding error detection process of the head-up display. For example, the blinding error detection circuit 90 performs the blinding error detection process in accordance with the display image data IMD and the result of the dimming control.

Figure 2:
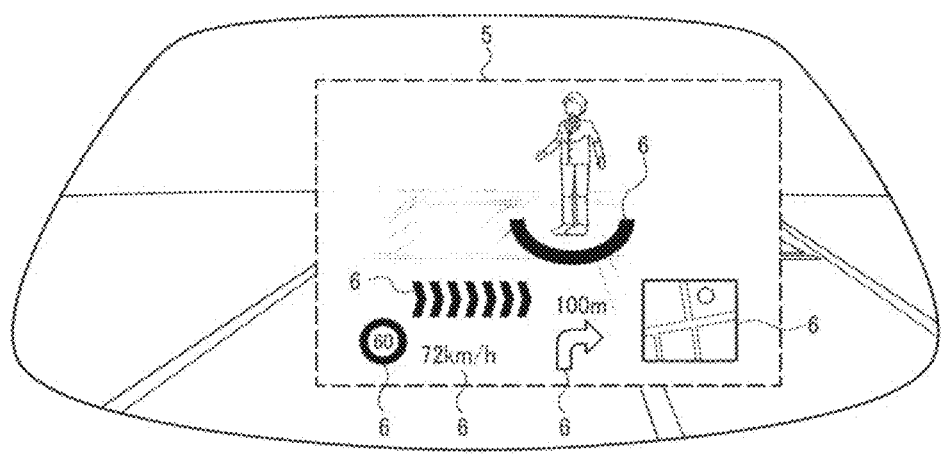
FIG. 2 shows a display example of a head-up display.

For example, FIG. 2 shows a display example of the head-up display. In the following description, the head-up display is referred to as HUD appropriately. The HUD includes the display panel, the backlight, and a projection optical system such as a reflector plate. Then, the backlight emits light, the light transmitted through the display panel such as a liquid crystal display panel is reflected toward a screen by the reflector plate, and the light reflected by the screen is incident on eyes of the user. Accordingly, display objects 6 of virtual images corresponding to display objects displayed on the display panel are projected to the field of view of the user. The display objects 6 of the virtual images overlap a real space which is a background of a HUD display. In a display region 5 of the HUD, a region in which the display objects 6 of the virtual images are not displayed is in a non-transmissive state on the display panel, and thus the region is a transparent region in which nothing is displayed, and the background is seen as it is.

Usually, a ratio of the display objects 6 to the display region 5 is low, so that the user can visually recognize the background passing through the display region 5. However, when the ratio of the display objects 6 that block the background to the display region 5 of the HUD is large, the user cannot visually recognize the background in the region in which the display objects 6 are displayed. That is, since the display objects 6 of the HUD hide the background, visibility of the background overlapping the display objects 6 may be reduced. Alternatively, when the display of the HUD is excessively bright with respect to the background, the visibility of the background is reduced. For example, it is assumed that a pixel value is in a range of 0 to 255, and when a pixel having a pixel value of 0, the background is transmissive. At this time, as the pixel value increases from 0, the background becomes less visible through the pixel.

When a ratio of such pixels that block the background increases to a certain extent, the visibility of the background is reduced as described above. In this manner, a display error, which is caused by the visibility of the background being reduced due to the blocking of the display objects 6 or the HUD display being in an excessively bright state as described above, is referred to as a blinding error in the present embodiment. The blinding error can also be referred to as an occlusion error or a glare error.

The blinding error detection circuit 90 detects such a blinding error. Then, when the blinding error is detected, error detection information is output. For example, in FIG. 1, the blinding error detection circuit 90 outputs an error detection signal ERR as the error detection information. The blinding error detection circuit 90 may also output error detection data of the blinding error as the error detection information. The error detection data is written to, for example, a register (not shown) accessible by an external processing device.

Here, in the technique of the related art of JP-A-2020-101784 described above, the blinding error is detected by checking only the display image data IMD output to the display device 100 and checking a luminance of an identified region of the display panel and a ratio of identified pixels.

However, in the method of detecting the blinding error by checking only the display image data IMD, there is a problem that a luminance of an image projected on a windscreen or the like of an automobile by the HUD cannot be correctly analyzed when the dimming control of the HUD and the color correction of the display image in accordance with the dimming control are performed. That is, originally, it is necessary to detect the blinding error in consideration of the dimming control and the color correction, but the method of checking only the display image data IMD cannot appropriately detect the blinding error.

Therefore, in the present embodiment, the blinding error detection circuit 90 performs the blinding error detection process in accordance with the display image data IMD and the result of the dimming control performed by the dimming control circuit 50. That is, in the present embodiment, the dimming control circuit 50 performs the dimming control of the light source such as the backlight based on the image data IM. Then, the color correction circuit 30 outputs the display image data IMD by performing the color correction on the image data IM in accordance with the result of dimming control. That is, in the present embodiment, when the dimming control is performed in the display device 100, the color correction circuit 30 performs the color correction, which is the color adjustment in which an adjustment amount of the dimming control is reflected, on the image data IM in order to make the displayed colors the same even when the dimming amount is changed. Then, the blinding error detection circuit 90 performs the blinding error detection process in accordance with the display image data IMD and the result of the dimming control. In this manner, it is possible to detect the blinding error reflecting the result of the dimming control performed by the dimming control circuit 50. For example, by reflecting the result of the dimming control, it is possible to detect the blinding error by the image data in a luminance state corresponding to the original image data IM, instead of a luminance state of the display image data IMD after the dimming control is performed. Therefore, as compared with the method of detecting the blinding error using only the display image data IMD, even when the dimming control is performed, it is possible to appropriately detect the blinding error.

Here, various processes can be assumed as the blinding error detection process. For example, the blinding error can be detected by calculating the luminance based on the image data for a color of a determination region of the blinding error or calculating an integrated value or average value of a luminance of the determination region. Alternatively, the blinding error may be detected based on the number of or a ratio of pixels whose luminance exceeds a threshold value. Alternatively, the blinding error may be detected based on the number of or a ratio of pixels whose luminance falls below a threshold value. Then, when the blinding error is detected, control for stopping a supply of the display image data IMD to the display device 100 and control for turning off a backlight 120 are performed. Regarding turning off the backlight, the backlight may be turned off in the entire screen region, or the light source corresponding to a region in which the error is detected may be turned off. Alternatively, when the blinding error is detected, a process of displaying the region in which the error is detected or the entire screen region in black may be performed. For example, the display image data IMD is made in a transparent color. The transparent color is a color in which, when a color displayed on the display panel is projected by the HUD, nothing is displayed on the HUD display and the background is seen as it is. Specifically, since the HUD display should become transparent when the pixels of the display panel block light, the color that becomes black when displayed on the display panel corresponds to the transparent color. For example, black data in the display image data IMD becomes the transparent color in the HUD display.

For example, the blinding error detection circuit 90 obtains a determination index value of the blinding error and compares the determination index value with a threshold value to perform the blinding error detection process. Specifically, the blinding error detection circuit 90 obtains the determination index value of the blinding error in accordance with the display image data IMD and the result of the dimming control, and compares the determination index value with the threshold value to detect the blinding error. The determination index value of the blinding error in accordance with the display image data IMD and the result of the dimming control is, for example, a determination index value obtained based on the display image data IMD and image data obtained from the result of the dimming control. The display image data IMD and the image data obtained from the result of the dimming control is image data after being subjected to reverse color correction described later, image data after being subjected to reverse distortion correction based on the image data after being subjected to the reverse color correction, or the like. The determination index value of the blinding error is an index value indicating a degree to which, when an image of the display image data IMD is displayed on the HUD, the visibility of the background is reduced by the image. For example, when the image of the display object displayed on the HUD blocks the background, or when the background becomes difficult to see due to a glare of the image displayed on the HUD, the determination index value of the blinding error represents a degree of the image blocking or a degree of the glare. The determination index value of the blinding error can be referred to as a determination index value of the occlusion error or a determination index value of the glare error.

The determination index value of the blinding error is, for example, the integrated value or the average value of the luminance of the pixels in the determination region of the blinding error. For example, the integrated value is obtained by performing integration processing of pixel values of the pixels in the determination region, and the average value is obtained by dividing the integrated value by the number of pixels in the determination region. As an example, a determination index value DV of the blinding error can be obtained by an equation of $DV=C1 \times Rsum+C2 \times Gsum+C3 \times Bsum$. Here, Rsum represents an integrated value of red pixel values, Gsum represents an integrated value of green pixel values, Bsum represents an integrated value of blue pixel values, and C1, C2, and C3 represent coefficients. The coefficients C1, C2, and C3 are, for example, coefficients used when the pixel values of RGB are converted into a luminance value Y of YCrCb, and appropriate coefficients are set in accordance with a color space adopted in the image data. However, the coefficients C1, C2, and C3 are not limited thereto, and may be any real number greater than 0. In addition, Y is integrated based on the calculation of the luminance value Y for each pixel, so that the determination index value DV of the blinding error may be calculated. In this case, $Y=C1 \times Rpx+C2 \times Gpx+C3 \times Bpx$, and $DV=Ysum$. Rpx, Gpx, and Bpx are a red pixel value, a green pixel value, and a blue pixel value of one pixel. Ysum represents an integrated value of the luminance values Y.

Alternatively, in the determination region, the number of high luminance pixels whose luminance exceeds the threshold value or a ratio of the number of high luminance pixels to a total number of pixels may be obtained as the determination index value of the blinding error. When the determination index value, which is the number of high luminance pixels or the ratio of high luminance pixels, exceeds the threshold value, it is determined that the blinding error is detected. Alternatively, in the determination region, the number of black pixels or a ratio of the number of black pixels to the total number of pixels may be obtained as the determination index value of the blinding error. The black pixel is a pixel of black data, but is not limited to complete-black data, and may be substantially-black data. When the determination index value, which is the number of black pixels or the ratio of black pixels, is smaller than the threshold value, it is determined that the blinding error is detected. As described above, various index values can be used as the determination index value of the blinding error.

The color correction circuit 30, the dimming control circuit 50, and the blinding error detection circuit 90 are logic circuits. These logic circuits may be implemented as separate circuits, or may be implemented as an integrated circuit by automatic placement and wiring, or the like. Alternatively, a part or all of these logic circuits may be implemented by a processor such as a digital signal processor (DSP). In this case, a program or an instruction set in which a function of each circuit is described is stored in a memory, and the function of each circuit is implemented by a processor executing the program or the instruction set.

2. First Configuration Example

Figure 3:
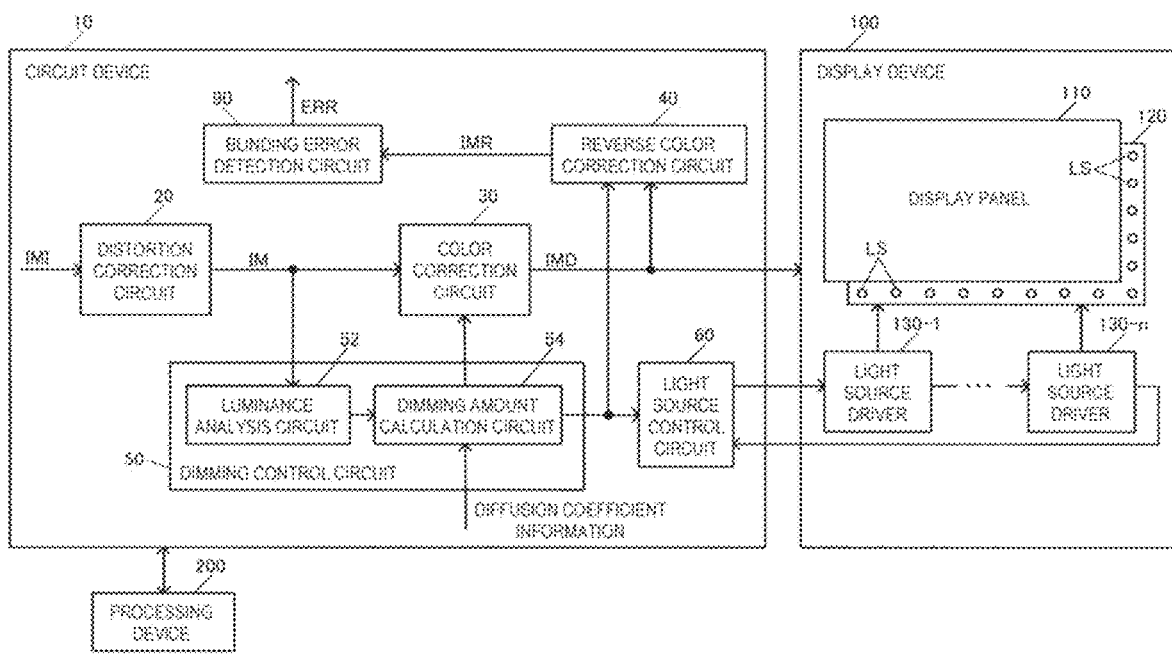
FIG. 3 shows a detailed first configuration example of the circuit device according to the present embodiment.

FIG. 3 shows a detailed first configuration example of the circuit device 10 according to the present embodiment. The circuit device 10 of FIG. 3 includes a distortion correction circuit 20, a light source control circuit 60, and a reverse color correction circuit 40 in addition to the configuration of FIG. 1. The circuit device 10 is not limited to the configuration of the first configuration example of FIG. 3 or a configuration of another configuration example to be described later, and various modifications such as omitting a part of components, adding other components, and replacing a part of the components with other components can be made.

A processing device 200 is provided outside the circuit device 10. The processing device 200 is, for example, a system on chip (SoC), and specifically is a microcomputer, a CPU, an MPU, or the like. For example, the circuit device 10 is communicably connected to the processing device 200 via an interface circuit (not shown). For example, input image data IMI from the processing device 200 is input to the circuit device 10 via the interface circuit.

The display device 100 includes a display panel 110, the backlight 120, and light source drivers 130-1 to 130-n. Here, n is an integer of 2 or more. The display device 100 may include a display driver (not shown) that drives the display panel 110. The display driver drives the display panel 110 based on the display image data IMD from the circuit device 10 to display on the display panel 110 a display image. The display driver may include a data driver that drives data lines of the display panel 110, a scanning driver that drives scanning lines of the display panel 110, a display controller, and the like. The backlight 120 is provided with a plurality of light sources LS. For example, the plurality of light sources LS are arranged in arrays.

Figure 4:
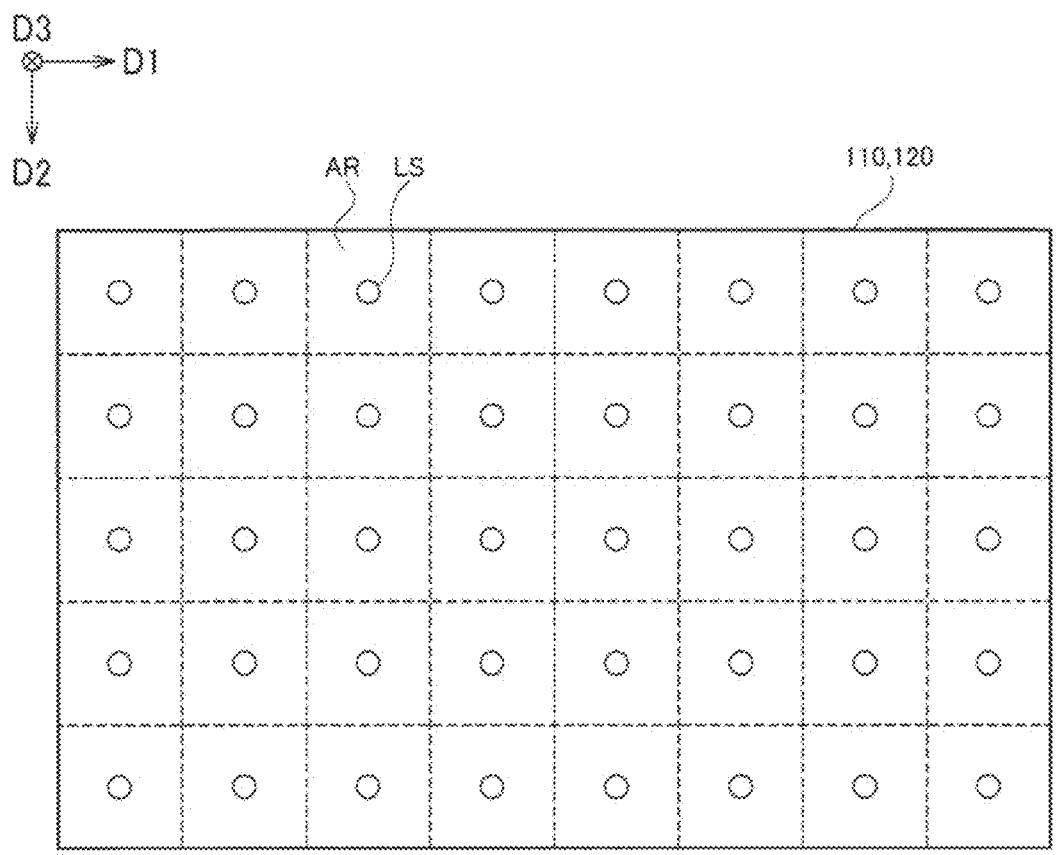
FIG. 4 shows configuration examples of a backlight and a display panel.

FIG. 4 shows configuration examples of the backlight 120 and the display panel 110. In FIG. 4, a direction D1 is a horizontal scanning direction of the display panel 110, and a direction D2 is a vertical scanning direction of the display panel 110. A direction D3 is a direction orthogonal to the directions D1 and D2, and is a direction in which the display panel 110 is viewed in a plan view. The backlight 120 is provided on a direction D3 side of the display panel 110, and emits illumination light in a direction opposite to the direction D3, which is a direction toward the display panel 110.

The backlight 120 includes the plurality of light sources LS. FIG. 4 shows an example in which 8×5 light sources LS are arranged in a two-dimensional array. That is, eight light sources LS are arranged along the direction D1, and five light sources LS are arranged along the direction D2. For appropriate local dimming, it is desirable to provide, for example, 100 or more light sources LS in the backlight 120. The light source LS is, for example, a light emitting diode (LED). The light source LS is not limited to the LED, and may be a light source whose light amount is independently controlled and which is close to a point light source. The light source close to the point light source is a light source in which a size of a light emitting portion of the light source LS is sufficiently smaller than an area AR corresponding to the light source LS. As the arrangement of the light sources LS, various arrangement forms such as a square arrangement and a hexagonal arrangement may be considered.

The display panel 110 has a pixel array, and an area in which the display image is displayed in the pixel array is set as a display area. The display area is divided into a plurality of areas AR. The light sources LS are disposed in the areas AR so that the light sources LS correspond to the areas AR, respectively. That is, one light source LS corresponds to one area AR. For example, when the display panel 110 is viewed in a plan view, the light source LS is disposed at a center of the area AR. However, an arrangement position of the light source LS is not limited thereto. In FIG. 4, the display area is divided into 8×5 areas AR, so as to correspond to 8×5 light sources LS. The area AR is used for processing in the circuit device 10, and the display image actually displayed on display panel 110 does not have a boundary of area AR. The display panel 110 is a panel in which a transmittance of each pixel is controlled in accordance with the display image, and the illumination light of the backlight 120 transmits through each pixel to display the display image. For example, the display panel 110 is a liquid crystal display panel.

Figure 5:
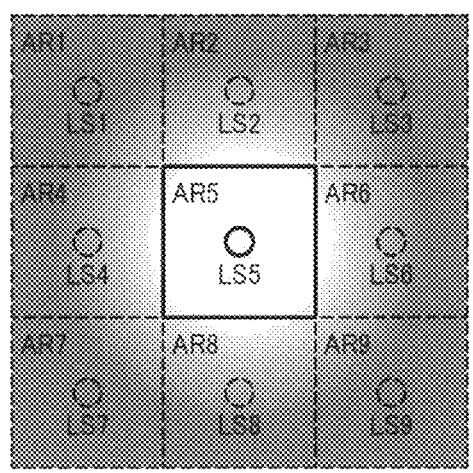
FIG. 5 is a schematic diagram showing a light source and a display area.

As described above, when the display area of the display panel 110 is divided into a plurality of areas such that the light sources LS are arranged in the respective areas AR, the light sources LS illuminating the display panel 110 each have a light intensity distribution in which a light intensity decreases as a distance from the light sources LS increases. Therefore, the light intensity in a peripheral portion becomes smaller than that in the center of the area AR. The light intensity distribution of the light source LS is referred to as PSF. FIG. 5 shows an example of the light intensity distribution of the PSF. In FIG. 5, the light intensity distribution is indicated by gradation, and as the light intensity is indicated whiter, a coefficient of the light intensity distribution is larger. In FIG. 5, a size of the PSF corresponds to 3×3 areas AR1 to AR9, and a center of the PSF is disposed at the position of the light source.

As shown in FIG. 3, the circuit device 10 includes the reverse color correction circuit 40 that performs the reverse color correction. Specifically, the reverse color correction circuit 40 performs the reverse color correction of the color correction on the display image data IMD to output image data IMR after being subjected to the reverse color correction. The reverse color correction is color correction of reversing the color correction performed by the color correction circuit 30, and is reverse conversion of conversion in the color correction. For example, the reverse color correction performed by the reverse color correction circuit 40 is color correction for returning the display image data IMD after being subjected to the color correction to the original image data IM. For example, when the color correction for increasing the luminance of each pixel of the display image data IMD is performed due to the decrease in light amount of the light source under the dimming control of the dimming control circuit 50, the reverse color correction circuit 40 performs the reverse color correction for decreasing the increased luminance and returning the luminance to the original luminance. Alternatively, when the hue is changed by the color correction, correction for returning the changed hue to the original hue may be performed as the reverse color correction. The image data IMR after being subjected to the reverse color correction that is output by the reverse color correction circuit 40 and the original image data IM do not need to completely match each other, and may match each other within a predetermined error range. The error range is a range of a rounding error, or the like. In addition, a resolution of the image data IMR after being subjected to the reverse color correction may not match a resolution of the original image data IM, and for example, the image data IMR after being subjected to the reverse color correction may be image data having a lower resolution.

The circuit device 10 further includes the distortion correction circuit 20. The distortion correction circuit 20 performs distortion correction of the input image data IMI and outputs the image data IM. Then, the color correction circuit 30 performs the color correction on the image data IM from the distortion correction circuit 20. The input image data IMI is received from the processing device 200 via, for example, an interface circuit (not shown).

Specifically, the distortion correction circuit 20 performs the distortion correction on the input image data IMI by using coordinate conversion between pixel coordinates in the input image data IMI and pixel coordinates in the image data IM, and outputs a result thereof as the image data IM. The distortion correction is image correction for making the HUD display to have no or reduced distortion by applying, to an image, image distortion reversed to image distortion when the image displayed on the display panel 110 is projected. The image distortion due to projection includes image distortion due to a curved surface of a screen of the HUD, image distortion due to a HUD optical system, and both two kinds of image distortion. For example, the HUD presents an image to a user by projecting the image on a transparent screen or displaying the image on a transparent display panel. At this time, the image is deformed in accordance with curvature or the like of the transparent screen or the transparent display panel, so that the user can see the image without distortion. The distortion correction circuit 20 performs such image deformation processing as the distortion correction.

For example, the distortion correction circuit 20 performs a reverse mapping process or a forward mapping process. The reverse mapping is also referred to as a reverse warp, and is a mapping process in which the pixel coordinates in the image data IM, which is output image data, are subjected to the coordinate conversion to obtain reference coordinates corresponding to the pixel coordinates, and pixel data of the image data IM is obtained from pixel data of the input image data IMI at the reference coordinates. The forward mapping is also referred to as a forward warp, and is a mapping process in which the pixel coordinates in the input image data IMI are subjected to the coordinate conversion to obtain movement destination coordinates corresponding to the pixel coordinates, and pixel data of the image data IM at the movement destination coordinates is obtained from pixel data of the input image data IMI at the pixel coordinates. The coordinate conversion in the reverse mapping and the forward mapping is defined by a mapping parameter also referred to as map data. The mapping parameter is a table in which the coordinates on the input image are associated with the coordinates on the output image, a table indicating a movement amount between the coordinates on the input image and the coordinates on the output image, a coefficient of a polynomial in which the coordinates on the input image are associated with the coordinates on the output image, or the like.

The dimming control circuit 50 performs the dimming control of the light source based on the image data IM. Specifically, the dimming control circuit 50 performs the dimming control of the backlight 120 having a plurality of light sources, and implements the dimming control referred to as, for example, the local dimming. For example, the dimming control circuit 50 performs a calculation process for obtaining information on the dimming amount based on the image data IM. Here, the information on the dimming amount is information for specifying the luminance at which the light source emits light under the dimming control. The light source control circuit 60 performs control processing and instruction processing on the light source drivers 130-1 to 130-n of the display device 100 based on the information on the dimming amount from the dimming control circuit 50. The light source drivers 130-1 to 130-n, which are LED drivers, drive the light sources LS of the backlight 120 based on the information on the dimming amount, thereby implementing the dimming control of the backlight 120. For example, the local dimming in which the dimming control is performed for each of the plurality of areas obtained by dividing the display area of the display panel 110 is implemented.

A processing device such as an MCU for absorbing a difference in communication protocol depending on models of the light source drivers 130-1 to 130-n may be provided between the light source control circuit 60 and the light source drivers 130-1 to 130-n. In this case, the light source drivers 130-1 to 130-n are controlled by the light source control circuit 60 via the processing device such as the MCU.

The dimming control circuit 50 includes a luminance analysis circuit 52 and a dimming amount calculation circuit 54. The luminance analysis circuit 52 performs luminance analysis of the image data IM. Then, the dimming amount calculation circuit 54 calculates the dimming amount of each light source based on a result of the luminance analysis. Specifically, based on the image data IM, the luminance analysis circuit 52 searches each of the plurality of areas of the display area for a pixel having a maximum luminance in each area. Then, a luminance distribution for each light source is determined, so that a color of the searched maximum luminance can be displayed. Then, the dimming amount calculation circuit 54 performs a calculation process of recalculating the luminance for each pixel based on the determined luminance distribution of the light source and diffusion coefficient information of the light source, and calculates the dimming amount corresponding to the luminance value of the backlight 120 for each pixel. The diffusion coefficient information is, for example, information on a diffusion coefficient parameter of a diffusion plate 115 in FIG. 14 to be described later. In addition, the information on the dimming amount from the dimming amount calculation circuit 54 is sent to the light source drivers 130-1 to 130-n via the light source control circuit 60, and the light source drivers 130-1 to 130-n perform driving to cause the light sources of the respective areas of the plurality of areas to emit light in accordance with the dimming amount, thereby implementing the local dimming.

On the other hand, the color correction circuit 30 performs the color correction in accordance with the dimming control performed by the dimming control circuit 50, and outputs the display image data IMD to the display device 100. For example, the display image data IMD is output to the display device 100 via an interface circuit (not shown). For example, the color correction circuit 30 performs the color correction in accordance with the dimming control of the backlight 120 based on the information on the dimming amount from the dimming amount calculation circuit 54. For example, when the dimming control for decreasing the light amount of the light source is performed in the area corresponding to the light source, the color correction circuit 30 performs the color correction to increase the luminance of the pixel in the area by an amount corresponding to the decrease in light amount of the light source in the area, and outputs the display image data IMD after being subjected to the color correction to the display device 100. Accordingly, the light amount of the light source in the area can be reduced, and the image corresponding to the original image data IM can be displayed in the area based on the display image data IMD obtained by the color correction, so that the local dimming can be implemented. As a result, it is possible to reduce the power consumption of the backlight 120 and to display an image in which black pixels appear blacker.

In addition, the reverse color correction circuit 40 performs the reverse color correction of the color correction on the display image data IMD after being subjected to the color correction to output the image data IMR after being subjected to the reverse color correction. For example, the reverse color correction circuit 40 performs the reverse color correction for returning the display image data IMD after being subjected to the color correction to the original image data IM before being subjected to the color correction based on the display image data IMD and the information on the dimming amount obtained by the dimming amount calculation circuit 54. For example, when the dimming control for decreasing the light amount of the light source is performed in the area corresponding to the light source and the color correction is performed to increase the luminance of the pixel in the area, the reverse color correction circuit 40 performs the reverse color correction for decreasing the luminance of the pixel in the area and returning the luminance to an original value, and outputs the image data IMR after being subjected to the reverse color correction.

As described above, the circuit device 10 according to the present embodiment includes the reverse color correction circuit 40 that performs the reverse color correction of the color correction on the display image data IMD based on the result of the dimming control to output the image data IMR after being subjected to the reverse color correction. Then, the blinding error detection circuit 90 performs the blinding error detection process based on the image data IMR after being subjected to the reverse color correction.

Accordingly, the blinding error detection process in accordance with the display image data IMD and the result of the dimming control is implemented. That is, the reverse color correction circuit 40 performs the reverse color correction based on the display image data IMD and the information on the dimming amount obtained by the dimming amount calculation circuit 54, and outputs the image data IMR after being subjected to the reverse color correction. Therefore, the image data IMR after being subjected to the reverse color correction becomes image data based on the display image data IMD and the result of the dimming control, and by detecting the blinding error based on the image data IMR after being subjected to the reverse color correction as described above, the blinding error detection process in accordance with the display image data IMD and the result of the dimming control is implemented. For example, based on the image data IMR after being subjected to the reverse color correction, the blinding error detection circuit 90 obtains the determination index value of the blinding error and compares the determination index value with the threshold value to detect the blinding error. Then, when the blinding error is detected, a process of stopping the supply of the display image data IMD to the display device 100, turning off the backlight 120, or changing the display image data IMD in an error detection region to the transparent color is performed. These processes may be performed by the circuit device 10 or may be performed by the processing device 200 outside the circuit device 10. In this manner, it is possible to prevent an occurrence of a situation in which the visibility of the background is reduced due to the blinding error.

For example, in the method of detecting a blinding error based on only the display image data IMD output to the display device 100, there is a possibility that the blinding error detection process in which the dimming control performed by the dimming control circuit 50 and the color correction performed by the color correction circuit 30 are correctly reflected cannot be implemented. That is, when the dimming control of the backlight 120 is performed by the dimming control circuit 50, the color correction in accordance with the dimming control is performed by the color correction circuit 30, and the display image data IMD after being subjected to the color correction is output to the display device 100. Therefore, by the color correction in accordance with the dimming control, a color level in the display image data IMD is different from a color level in the original image data IM, and the blinding error cannot be correctly detected by the detection process using only the display image data IMD. For example, in an area in which the light amount of the light source is decreased by the dimming control, the color correction for increasing the luminance of the pixel in the area is performed on the display image data IMD. Therefore, when the blinding error is detected only based on the display image data IMD, the blinding error may be erroneously detected in this area. For example, there is a possibility that an error is erroneously detected as the blinding error even though the error is not the blinding error. Alternatively, in a case in which the color correction is performed to increase the light amount of the light source and decrease the luminance of the pixel in accordance with the increase, when the blinding error is detected only based on the display image data IMD, there is a possibility that the original blinding error cannot be detected.

In this regard, in FIG. 3, the reverse color correction is performed on the display image data IMD based on the result of the dimming control to generate the image data IMR after being subjected to the reverse color correction corresponding to the original image data IM, and the blinding error is detected based on the image data IMR after being subjected to the reverse color correction. In this manner, it is possible to detect the blinding error based on the image data IMR after being subjected to the reverse color correction obtained by restoring the original image data IM, instead of the display image data IMD subjected to the color correction in accordance with the dimming control. Therefore, even when the dimming control or the color correction based on the dimming control is performed, the blinding error can be appropriately detected. That is, the dimming control is performed by the dimming control circuit 50, and a display image based on the display image data IMD after being subjected to the color correction is displayed on the display panel 110, so that an image corresponding to the original image data IM is viewed by the user. Therefore, by detecting the blinding error based on the image data IMR after being subjected to the reverse color correction corresponding to the original image data IM, it is possible to implement appropriate error detection.

The color correction circuit 30, the reverse color correction circuit 40, the blinding error detection circuit 90, the distortion correction circuit 20, the dimming control circuit 50, and the light source control circuit 60 are logic circuits, and these logic circuits may be implemented as separate circuits, or may be implemented as an integrated circuit by automatic placement and wiring, or the like. Alternatively, a part or all of these logic circuits may be implemented by a processor such as the DSP. The same applies to other configuration examples to be described later.

Figure 6:
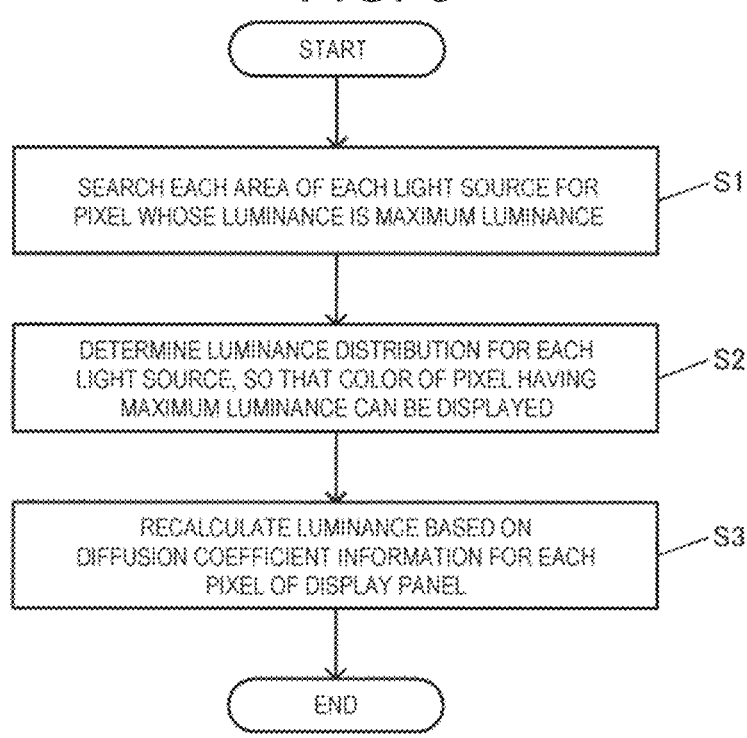
FIG. 6 is a flowchart showing a process of luminance calculation for each pixel.

Next, a specific processing example according to the present embodiment will be described. FIG. 6 is a flowchart showing a processing example of luminance calculation for each pixel. First, each area of each light source is searched for a pixel whose luminance is the maximum luminance (step S1). For example, in each area corresponding to each light source described with reference to FIGS. 4 and 5, based on the image data IM, luminances of pixels existing in the area are searched for, and the pixel whose luminance is the maximum luminance in the area is found. Then, a luminance distribution for each light source is determined, so that a color of the pixel having the maximum luminance can be displayed (step S2). For example, it is assumed that a luminance range is 0 to 100 and the luminance of the pixel having the maximum luminance is 50 in a target area. In this case, the luminance distribution of the light source is determined, so that a pixel having a luminance of 50, which is the maximum luminance, can be displayed in a color having a luminance of 100, which is an upper limit of the luminance range, for example. When the luminance of the pixel having the maximum luminance is the upper limit luminance of the luminance range, luminances of other pixels are guaranteed to fall within the luminance range of 0 to 100. Then, for each pixel of the display panel 110, the luminance is recalculated based on the diffusion coefficient information (step S3). As a result, the luminance value of the backlight 120 for each pixel is obtained.

Figure 14:
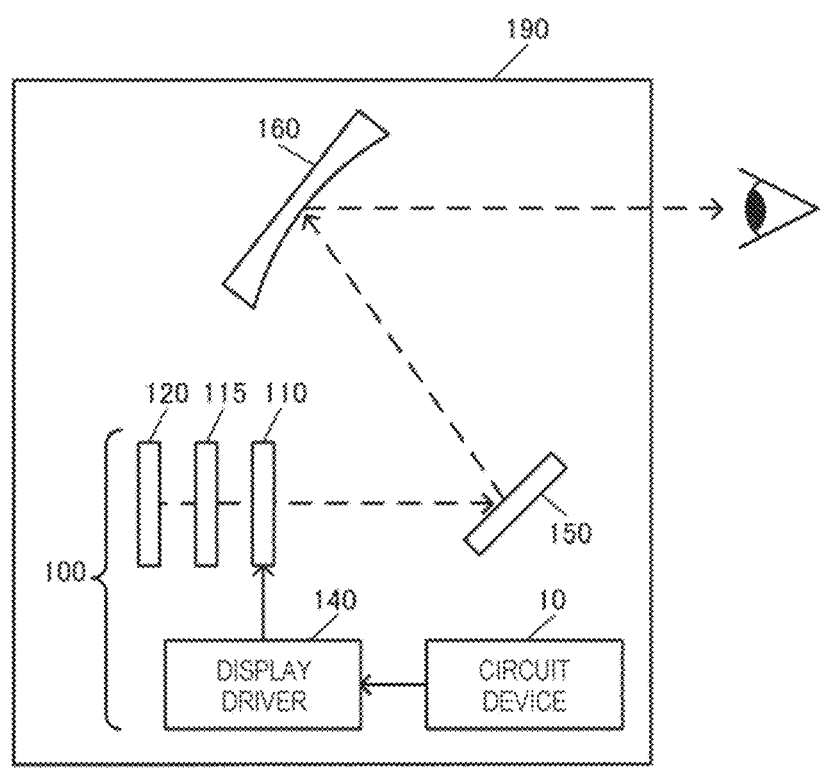
FIG. 14 shows a configuration example of the head-up display according to the present embodiment.

For example, as shown in FIG. 14 to be described later, in the display device 100, the diffusion plate 115 for diffusing light from the light source to obtain a uniform luminance distribution is provided, for example, between the backlight 120 and the display panel 110. The diffusion plate 115 is also referred to as a diffusion sheet. For example, as shown in FIG. 5, the light intensity distribution PSF of the light source is the intensity distribution in which the light intensity decreases as the distance from the light source increases, but by providing the diffusion plate 115 and diffusing the light from the light source, luminance unevenness can be reduced, and a uniform surface light source can be implemented. Here, examples of a light diffusion type include a direct type, a side light type, and an edge light type. Then, in step S3 of FIG. 6, in addition to the light intensity distribution PSF of the light source of FIG. 5, the diffusion of the light from the light source using the diffusion plate 115 is also reflected, and the luminance of each pixel of the display panel 110 is recalculated to obtain the luminance value of the backlight 120 for each pixel. As an example, for a target pixel, light intensities of the light sources of, for example, 4×4 LEDs around the target pixel are obtained based on the light intensity distribution PSF of FIG. 5 and the diffusion coefficient information of the diffusion plate 115 to recalculate the luminance and obtain the luminance value of the backlight 120 for each pixel. In this manner, in the display device 100 including the backlight 120 having the plurality of light sources and the diffusion plate 115, it is possible to appropriately obtain the luminance value of the backlight 120 for each pixel.

Figure 7:
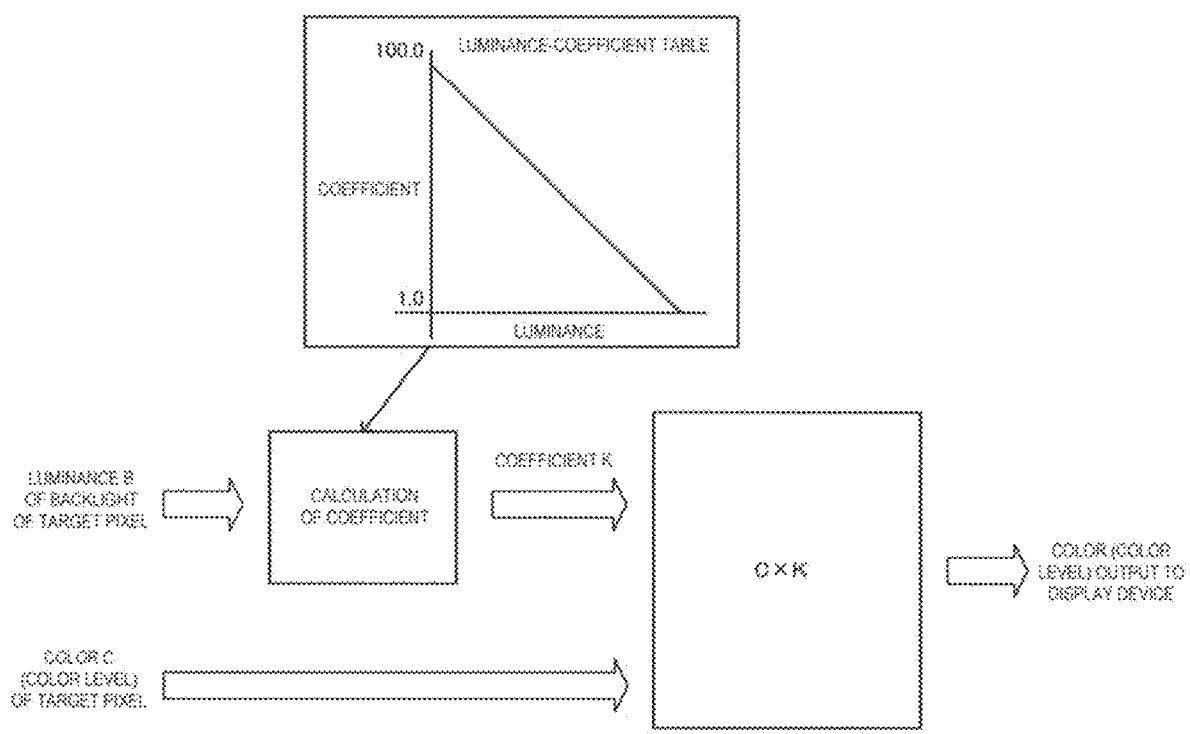
FIG. 7 is a schematic diagram of color correction.

FIG. 7 is a schematic diagram of a processing example of the color correction. First, as described with reference to FIG. 6, a luminance B of the backlight 120 of a target pixel is obtained. In addition, a luminance-coefficient table is stored in a storage circuit (not shown) of the circuit device 10, and a coefficient K is calculated based on the luminance B of the backlight 120 using the table. The luminance-coefficient table in FIG. 7 is a table in which the coefficient K increases as the luminance B decreases. Instead of using such a luminance-coefficient table, the coefficient K may be obtained from the luminance B based on a predetermined calculation formula. In addition, although the luminance-coefficient table in FIG. 7 has primary characteristics, the present disclosure is not limited thereto, and appropriate characteristics in accordance with characteristics of human eyes with respect to the brightness of light may be used. Alternatively, the coefficient K may be obtained by interpolating two output values of the luminance-coefficient table by primary interpolation, spline interpolation, or the like. Then, a multiplication process of the coefficient K obtained in this manner and a level of a color C of the target pixel is performed to obtain a level of a color to be output to the display device 100. That is, a process of increasing a color level of image data is performed on a pixel having the low luminance B of the backlight 120. In this manner, the color correction circuit 30 can obtain the display image data IMD from the image data IM and output the display image data IMD to the display device 100. In the luminance-coefficient table of FIG. 7, the coefficient K increases as the luminance B of the backlight 120 decreases, and thus, the lower the luminance of the backlight 120 for the target pixel is, the higher the color level of the target pixel is, and the dimming control can be implemented.

Figure 8:
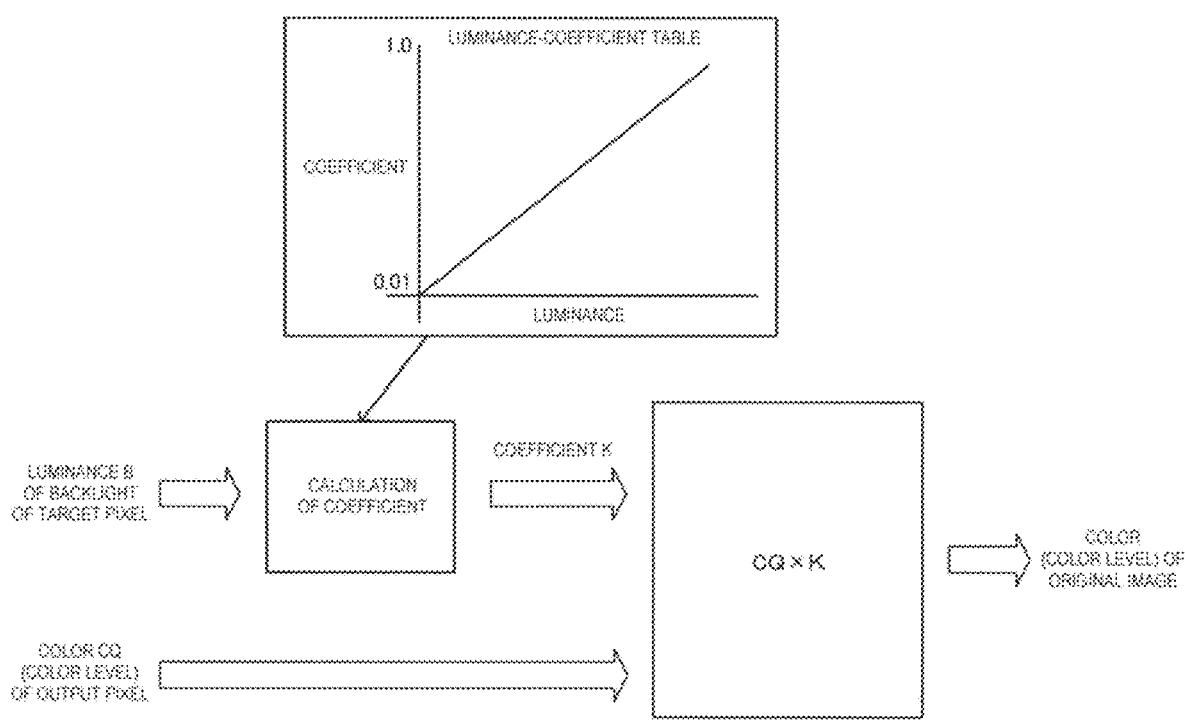
FIG. 8 is a schematic diagram of reverse color correction.

FIG. 8 is a schematic diagram of a processing example of the reverse color correction. First, the coefficient K is calculated based on the luminance B of the backlight 120 of the target pixel and the luminance-coefficient table. The luminance-coefficient table of FIG. 7 has the characteristic that the coefficient K increases as the luminance B of the backlight 120 decreases, but the luminance-coefficient table of FIG. 8 has a characteristic contrary to FIG. 7 that the coefficient K decreases as the luminance B decreases. By using the table having such a characteristic, it is possible to implement the reverse color correction of the color correction of FIG. 7. Then, a multiplication process of the coefficient K obtained in this manner and a level of a color CQ of an output pixel is performed to obtain a color level of the original image. That is, in the color correction, the process of increasing the color level of the image data is performed on the pixel having the low luminance B of the backlight 120, whereas in the reverse color correction, a process of decreasing the color level of the image data is performed on the pixel having the low luminance B of the backlight 120. In this manner, the reverse color correction circuit 40 can obtain the image data IMR after being subjected to the reverse color correction corresponding to the original image data IM from the display image data IMD and output the image data IMR after being subjected to the reverse color correction to the blinding error detection circuit 90. That is, in the luminance-coefficient table of FIG. 8, the coefficient K decreases as the luminance of the backlight 120 decreases, and thus, the reverse color correction, which is reverse conversion of the color correction in FIG. 7, can be performed on the display image data IMD to obtain the image data IMR after being subjected to the reverse color correction corresponding to the original image data IM. Then, the blinding error detection circuit 90 performs the blinding error detection process based on the image data IMR after being subjected to the reverse color correction. Accordingly, the blinding error detection process in accordance with the display image data IMD and the result of the dimming control is implemented.

Instead of using the luminance-coefficient table as shown in FIG. 8, the coefficient K may be obtained from the luminance B based on a predetermined calculation formula. Alternatively, the coefficient K may be obtained by interpolating two output values of the luminance-coefficient table by primary interpolation, spline interpolation, or the like. Although the color correction table and the reverse color correction table are separately provided in FIGS. 7 and 8, the color level of the original image may be obtained by calculating the coefficient K using the color correction table of FIG. 7 and performing division processing of the coefficient K on the color CQ of the output pixel.

As described above, in the present embodiment, the color correction circuit 30 performs the color correction in accordance with the luminance of the light source of the display device 100 on the image data IM. Then, the reverse color correction circuit 40 performs the reverse color correction in accordance with the luminance of the light source of the display device 100 on the display image data IMD.

In this manner, when the dimming control for controlling the luminance of the light source of the display device 100 is performed, the color correction in accordance with the luminance of the light source due to the dimming control is performed on the image data IM, and the display image data IMD after being subjected to the color correction is output to the display device 100. Further, the reverse color correction in accordance with the luminance of the light source is performed on the display image data IMD, so that the image data IMR after being subjected to the reverse color correction corresponding to the original image data IM is output to the blinding error detection circuit 90. In this manner, the blinding error detection circuit 90 can detect the blinding error based on the image data IMR after being subjected to the reverse color correction obtained by restoring the original image data IM, instead of the display image data IMD. Therefore, even when the dimming control or the color correction based on the dimming control is performed, the blinding error can be appropriately detected.

Specifically, as shown in FIG. 3, the display device 100 includes the display panel 110 and the backlight 120 including the plurality of light sources. Further, as described with reference to FIGS. 4 and 5, the light sources of the plurality of light sources are provided corresponding to the respective areas of the plurality of areas of the display panel 110. Then, the color correction circuit 30 performs the color correction in accordance with the luminance of each light source on the image data IM, and the reverse color correction circuit 40 performs the reverse color correction in accordance with the luminance of each light source on the display image data IMD.

In this manner, when the dimming control for controlling the luminances of the plurality of light sources of the backlight 120 is performed, the color correction in accordance with the luminance of each of the plurality of light sources due to the dimming control is performed on each pixel irradiated with the light from each light source in the image data IM, and the display image data IMD after being subjected to the color correction is output to the display device 100. Further, the reverse color correction in accordance with the luminance of each of the plurality of light sources of the backlight 120 is performed on each pixel irradiated with the light from each light source in the display image data IMD, so that the image data IMR after being subjected to the reverse color correction corresponding to the original image data IM is output to the blinding error detection circuit 90, and the blinding error is detected. Therefore, even when the dimming control of the backlight 120 or the color correction based on the dimming control is performed, the blinding error can be appropriately detected.

For example, in the display device 100, light from the light source of the backlight 120 is emitted to the display panel 110, and the display panel 110 is driven to display based on the display image data IMD from the circuit device 10, thereby displaying an image. Taking a head-up display 190 in FIG. 14 as an example, a virtual image corresponding to the display image is displayed for the user by projecting the display image of the display panel 110 onto a transparent screen 160 which is the windscreen. The dimming control circuit 50 performs the dimming control for controlling the luminance of the light source of the backlight 120 based on the image data IM.

Then, the color correction circuit 30 performs the color correction in accordance with the luminance of the light source of the backlight 120 as described with reference to FIG. 7. For example, the color correction circuit 30 performs the color correction to increase the color level of each pixel of the display image data IMD as the luminance of the light source decreases due to the dimming control. That is, for the pixel in which the luminance of the light source decreases due to the dimming control, the color correction is performed to increase the luminance of the color of the pixel. As a result, the local dimming is implemented.

On the other hand, the reverse color correction circuit 40 performs the reverse color correction in accordance with the luminance of the light source of the backlight 120 as described with reference to FIG. 8. For example, the color correction circuit 40 performs the reverse color correction to decrease the color level of each pixel of the image data IMR after being subjected to the reverse color correction as the luminance of the light source decreases due to the dimming control. That is, for the pixel in which the luminance of the color is increased by the color correction, the reverse color correction for decreasing the luminance of the color is performed to generate the image data IMR after being subjected to the reverse color correction by restoring the original image data IM. In this manner, the blinding error detection circuit 90 can detect the blinding error based on the image data IMR after being subjected to the reverse color correction corresponding to the original image data IM. Therefore, even when the dimming control of the backlight 120 or the color correction based on the dimming control is performed, the blinding error can be appropriately detected.

As shown in FIG. 3, the circuit device 10 includes the luminance analysis circuit 52 that performs the luminance analysis of the image data IM, and the dimming amount calculation circuit 54 that calculates the dimming amount of each light source based on the result of the luminance analysis. The color correction circuit 30 performs the color correction based on the calculation result of the dimming amount obtained by the dimming amount calculation circuit 54, and the reverse color correction circuit 40 performs the reverse color correction based on the calculation result of the dimming amount performed by the dimming amount calculation circuit 54. In this manner, the dimming amount of each of the plurality of light sources of the backlight 120 is calculated based on the result of the luminance analysis of the image data IM, and the dimming control of the backlight 120 is performed based on the calculated dimming amount. Then, the color correction is performed based on the dimming amount calculated in this manner, so that the color correction in accordance with the dimming control of the backlight 120 is performed, and the display image data IMD after being subjected to the color correction can be output to the display device 100. Further, the reverse color correction in accordance with the calculated dimming amount is performed on the display image data IMD after being subjected to the color correction, so that the image data IMR after being subjected to the reverse color correction corresponding to the image data IM before being subjected to the color correction is input to the blinding error detection circuit 90, and the blinding error can be appropriately detected.

Further, the dimming amount calculation circuit 54 calculates the dimming amount of each light source based on the diffusion coefficient information of the backlight 120 and the result of the luminance analysis. For example, as shown in FIG. 14, when the diffusion plate 115 is provided for the backlight 120 and the light of the light source of the backlight 120 is diffused, the dimming amount of each light source is calculated based on the diffusion coefficient information of the light of the light source by the diffusion plate 115 and the result of the luminance analysis of the image data IM. In this manner, when the luminance unevenness is reduced by diffusing the light from the light source of the backlight 120, it is possible to perform the dimming control, in which the diffusion of the light of the light source is reflected, and the color correction.

In the present embodiment, the blinding error detection circuit 90 obtains the determination index value of the blinding error and compares the determination index value with the threshold value to perform the blinding error detection process. Specifically, the blinding error detection circuit 90 obtains the determination index value in accordance with the display image data IMD and the result of the dimming control, and compares the determination index value with the threshold value to detect the blinding error. For example, in FIG. 3, the image data IMR after being subjected to the reverse color correction generated based on the display image data IMD and the result of the dimming control is input to the blinding error detection circuit 90. Then, based on the image data IMR after being subjected to the reverse color correction, the blinding error detection circuit 90 obtains the determination index value of the blinding error and compares the determination index value with the threshold value to detect the blinding error. Alternatively, as will be described later, the blinding error detection circuit 90 obtains the determination index value based on the image data after being subjected to the reverse distortion correction generated based on the display image data IMD and the result of the dimming control, and compares the determination index value with the threshold value to detect the blinding error. In this manner, by using the determination index value obtained in accordance with the display image data IMD and the result of the dimming control, it is possible to detect the blinding error with simple processing. Then, when the blinding error is detected, the supply of the display image data IMD is stopped, the backlight 120 is turned off, or the display image data IMD is displayed in black with the transparent color. In this manner, it is possible to prevent the occurrence of the situation in which the visibility of the background is reduced due to the blinding error.

Here, the threshold value is stored in, for example, a storage circuit (not shown) of the circuit device 10. The determination index value is, for example, the integrated value or the average value of the luminance of the pixels in the determination region of the blinding error as described above, or the number of high luminance pixels or the ratio of high luminance pixels in the determination region. In this case, the blinding error detection circuit 90 determines that the blinding error is detected when the determination index value exceeds the threshold value. Alternatively, the determination index value is the number of black pixels or the ratio of black pixels in the determination region. In this case, the blinding error detection circuit 90 determines that the blinding error is detected when the determination index value is smaller than the threshold value. As described above, it is possible to implement the appropriate blinding error detection process using the determination index value.

3. Second Configuration Example

Figure 9:
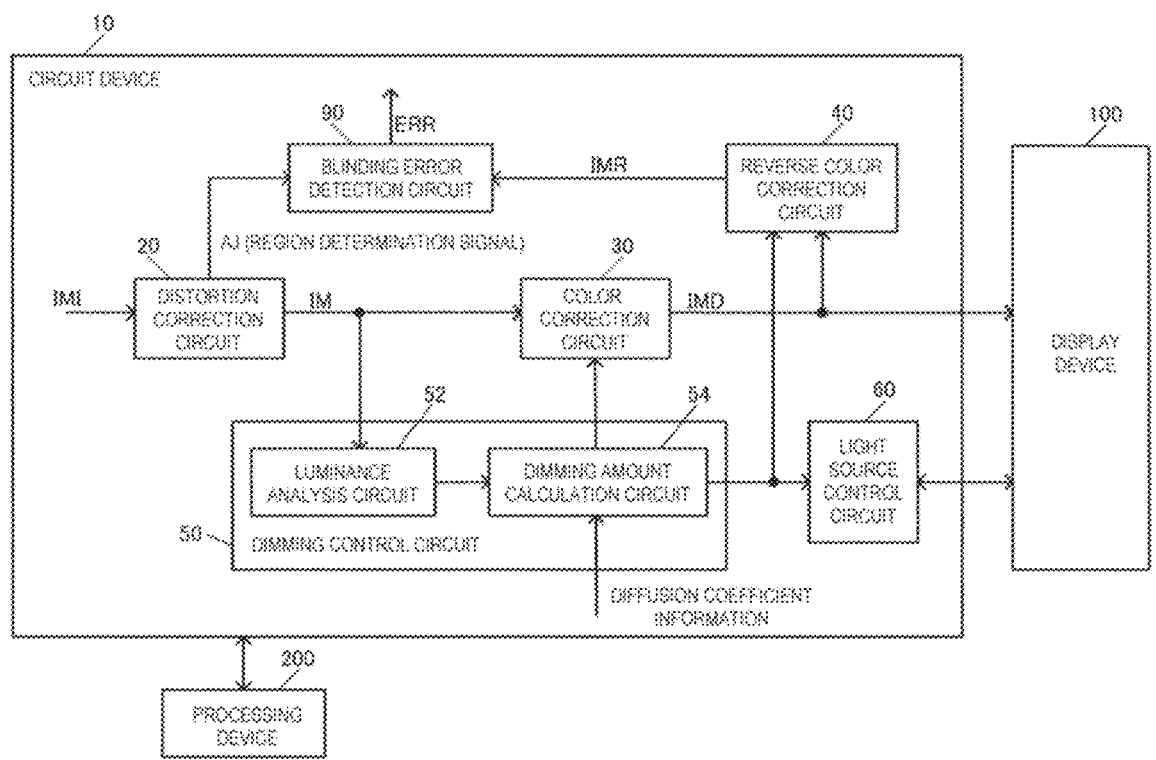
FIG. 9 shows a detailed second configuration example of the circuit device according to the present embodiment.

FIG. 9 shows a detailed second configuration example of the circuit device 10 according to the present embodiment. In FIG. 9, the circuit device 10 includes the distortion correction circuit 20 that performs the distortion correction of the input image data IMI and outputs the image data IM, and the blinding error detection circuit 90 performs the blinding error detection process in each of a plurality of regions obtained by dividing the image of the input image data IMI based on a region determination signal AJ output from the distortion correction circuit 20.

That is, the circuit device 10 according to the present embodiment includes the distortion correction circuit 20 that performs the distortion correction of the input image data IMI and outputs the image data IM. In this manner, it is possible to perform the color correction and the dimming control based on the image data IM after being subjected to the distortion correction by the distortion correction circuit 20. Therefore, even in the display device 100 of the HUD that requires the distortion correction for the image display, it is possible to implement the appropriate color correction and dimming control. Specifically, for example, as shown in FIG. 14, even when the transparent screen 160, which is a projection surface of the display image of the display device 100, is curved, the distortion correction in accordance with the curvature is performed, so that an image without distortion can be displayed to the user, and the appropriate color correction and dimming control can be implemented. In the present embodiment, the blinding error detection circuit 90 performs the blinding error detection process based on the region determination signal AJ output from the distortion correction circuit 20.

Figure 10:
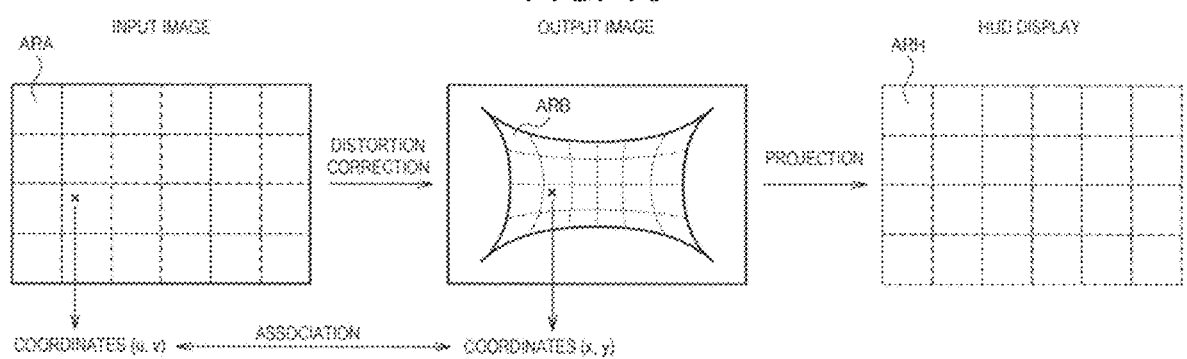
FIG. 10 is a schematic diagram of an input image, an output image, and a HUD display image of a distortion correction circuit.

For example, FIG. 10 is a diagram illustrating a relationship among an input image of the distortion correction circuit 20, an output image of the distortion correction circuit 20, and a HUD display image. The input image of the distortion correction circuit 20 corresponds to the input image data IMI, and the output image of the distortion correction circuit 20 corresponds to the image data IM. An image of the display image data IMD obtained by performing the color correction on the image data IM is displayed on the HUD.

In FIG. 10, each first divided region of a first divided region group obtained by dividing the input image is indicated by ARA. Specifically, the divided region is set by a plurality of straight lines in the horizontal scanning direction and a plurality of straight lines in the vertical direction. FIG. 10 shows an example in which the image is divided into 6×4, but the number of divisions is not limited thereto. In addition, although FIG. 10 shows an example in which the image is equally divided in the horizontal direction and the vertical direction, the image may be unequally divided.

The input image is subjected to the distortion correction in a direction reversed to the distortion caused by HUD projection, and then projected by the HUD, so that a display without distortion similar to that of the input image is obtained. That is, setting the first divided region group in the input image is equivalent to setting a divided region group in the HUD display. The divided region group in the HUD display is set as a third divided region group, and each third divided region is indicated by ARH. A shape of the third divided region ARH is the same as that of the first divided region ARA corresponding to the third divided region ARH. Coordinates (u, v) on the input image and coordinates (x, y) on the output image are associated with each other by the coordinate conversion of the distortion correction. By the association of these coordinates, the output image is divided into a second divided region group corresponding to the first divided region group. Each second divided region of the second divided region group is indicated by ARB. The second divided region ARB has a distorted shape due to the distortion correction.

For example, in the present embodiment, it is possible to detect the blinding error in which visibility of an object such as a person or a bicycle is reduced due to the image of the HUD in FIG. 2. In this case, an object such as a bicycle may be detected by, for example, a camera (not shown), and the blinding error detection process may be performed by setting a region of the object as the determination region. Taking FIG. 10 as an example, in the HUD display image, the blinding error may be detected by setting the third divided region ARH in which an object such as a person or a bicycle is displayed as the determination region. Specifically, a threshold value of the region in which an object such as a person or a bicycle is detected and a threshold value of the other region are set to different values, and the set threshold values are compared with the determination index value of the blinding error to detect the blinding error. As an example, the threshold value of the region in which an object is detected is set to a small value, the threshold value of the other region is set to a large value, and when the determination index value exceeds the set threshold value, it is determined that the blinding error occurs. In this manner, in the region in which an object such as a person or a bicycle is located, the blinding error is detected with a smaller determination index value, and thus it is possible to effectively prevent a situation in which the object is blocked by the HUD image and cannot be seen.

In FIG. 9, the blinding error detection circuit 90 detects the blinding error based on an image after being subjected to the reverse color correction obtained by performing the color correction on the output image of the distortion correction circuit 20 and then performing the reverse color correction on the output image. Therefore, in FIG. 10, it is necessary to detect the blinding error by setting the second divided region ARB, which is an area having a distorted shape, as the determination region. Therefore, there is a problem in that it is difficult to determine which region of the image after being subjected to the reverse color correction is set as the determination region to detect the blinding error.

Therefore, in the present embodiment, the distortion correction circuit 20 outputs the region determination signal AJ, and the blinding error detection circuit 90 performs the blinding error detection process in each of the plurality of regions obtained by dividing the image of the input image data IMI based on the region determination signal AJ output from the distortion correction circuit 20. In this manner, in the image after being subjected to the reverse color correction obtained by performing the color correction and the reverse color correction on the output image of the distortion correction circuit 20, the blinding error detection circuit 90 can determine the determination region based on the region determination signal AJ from the distortion correction circuit 20 and detect the blinding error in the determination region.

For example, the image of the input image data IMI corresponds to the input image of FIG. 10, and each of the plurality of regions obtained by dividing the input image corresponds to the first divided region ARA of FIG. 10. Since the distortion correction circuit 20 performs the distortion correction based on information on the association between the coordinates (u, v) in the input image and the coordinates (x, y) in the output image, the distortion correction circuit 20 can output the region determination signal AJ for determining which first divided region ARA of the input image corresponds to the second divided region ARB of the output image. As described above, the first divided region ARA of the input image corresponds to the third divided region ARH of the HUD display image. Therefore, the blinding error detection circuit 90 can determine the third divided region ARH in which the object is located in the image after being subjected to the reverse color correction based on the region determination signal AJ from the distortion correction circuit 20, and detect the blinding error by setting the region as the determination region. As a result, in the image after being subjected to the reverse color correction corresponding to the output image of the distortion correction circuit 20, the blinding error detection circuit 90 can determine the determination region based on the region determination signal AJ and detect the blinding error in the determination region.

4. Third Configuration Example

Figure 11:
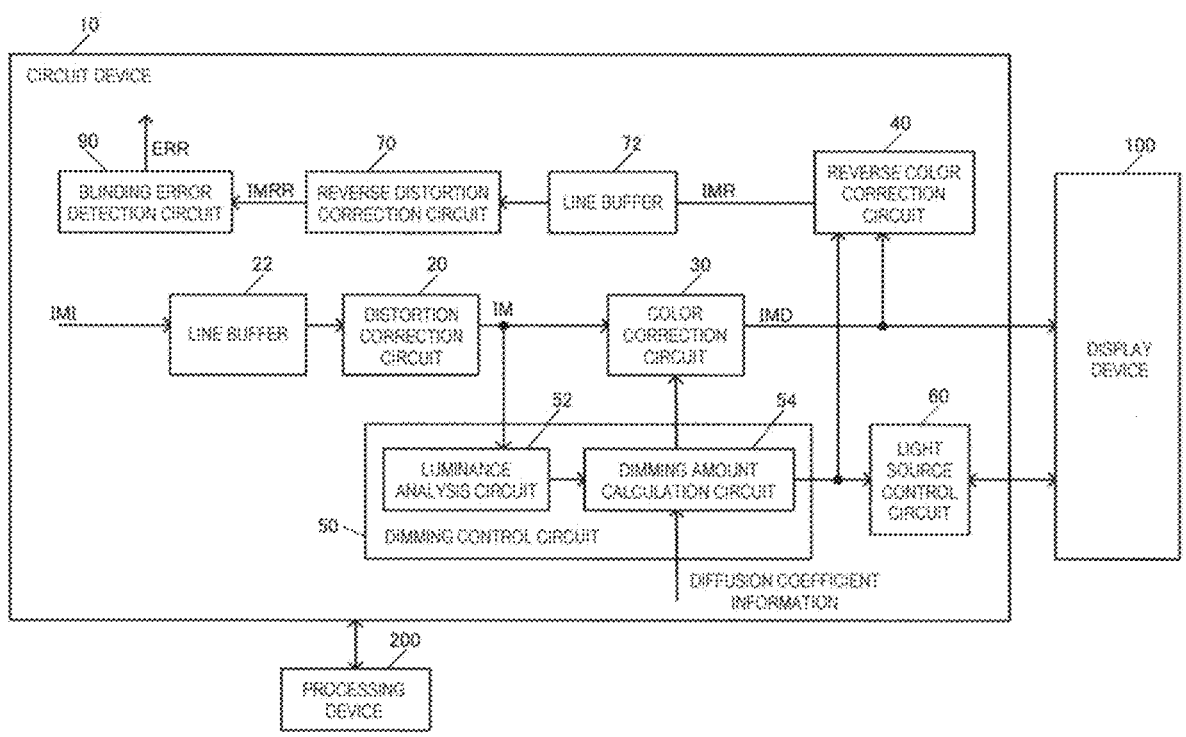
FIG. 11 shows a detailed third configuration example of the circuit device according to the present embodiment.

FIG. 11 shows a detailed third configuration example of the circuit device 10 according to the present embodiment. In the third configuration example, in addition to the configuration of FIG. 3, a reverse distortion correction circuit 70 and line buffers 22 and 72 are provided. For example, in FIG. 3, the blinding error detection circuit 90 detects the blinding error based on the image data IMR after being subjected to the reverse color correction. On the other hand, in FIG. 11, the blinding error detection circuit 90 detects the blinding error based on image data IMRR after being subjected to the reverse distortion correction obtained by performing the reverse distortion correction on the image data IMR after being subjected to the reverse color correction. In this manner, the blinding error detection circuit 90 can perform the blinding error detection process based on the image data IMRR after being subjected to the reverse distortion correction corresponding to the original input image data IMI, and it is possible to detect the blinding error by setting the determination region of the blinding error with simple processing.

For example, the distortion correction circuit 20 performs, as a distortion correction process, a mapping process of mapping an image in accordance with a surface shape of a projection target object. The mapping process is a process of deforming an image, so that the image projected on the projection target object is not distorted when viewed from the user. On the other hand, the reverse distortion correction circuit 70 performs, as a reverse distortion correction process, a reverse mapping process corresponding to reverse conversion of the mapping process performed by the distortion correction circuit 20. The reverse mapping process is conversion for returning an image deformed in accordance with the projection target object to the image before being deformed. The projection target object is an object on which the display image generated by the circuit device 10 is projected or displayed. In a case of an in-vehicle head-up display, the projection target object is a windscreen of an automobile or the like. The mapping process is a process of performing the coordinate conversion of a pixel position of an image based on the mapping parameter which is also referred to as the map data. The mapping process can include interpolation processing of pixel values and the like as processing associated with the coordinate conversion. The mapping process includes the forward mapping and the reverse mapping. The mapping parameter is a parameter indicating the coordinate conversion corresponding to a shape of a reflective surface of the projection target object, and is table data or the like that associates the pixel position of the image before the mapping process with the pixel position of the image after the mapping process. The mapping process performed by the distortion correction circuit 20 and the reverse mapping process performed by the reverse distortion correction circuit 70 can be implemented using the mapping parameter. In addition, the line buffer 22 is provided at a preceding circuit of the distortion correction circuit 20, and the distortion correction circuit 20 performs the distortion correction using the input image data IMI temporarily stored and accumulated in the line buffer 22. In addition, the line buffer 72 is also provided at a preceding circuit of the reverse distortion correction circuit 70, and the reverse distortion correction circuit 70 performs the reverse distortion correction using the image data IMI after being subjected to the reverse color correction temporarily stored and accumulated in the line buffer 72. The line buffers 22 and 72 temporarily store image data of scanning line segments of a predetermined number of lines, for example.

As described above, the circuit device 10 of FIG. 11 includes the distortion correction circuit 20 that performs the distortion correction on the input image data IMI and outputs the image data IM, and the color correction circuit 30 that performs the color correction on the image data IM based on the result of the dimming control and outputs the display image data IMD. The circuit device 10 further includes the reverse color correction circuit 40 that performs the reverse color correction on the display image data IMD based on the result of the dimming control to output the image data IMR after being subjected to the reverse color correction, and the reverse distortion correction circuit 70 that performs the reverse distortion correction of the distortion correction on the image data IMR after being subjected to the reverse color correction to output the image data IMRR after being subjected to the reverse distortion correction. Then, the blinding error detection circuit 90 performs the blinding error detection process based on the image data IMRR after being subjected to the reverse distortion correction. In this manner, it is possible to set the determination region of the blinding error in a coordinate system of the original input image data IMI, and thus it is possible to facilitate the setting of the determination region.

That is, the image data IMRR after being subjected to the reverse distortion correction is image data obtained by the distortion correction circuit 20 performing the distortion correction on the original input image data IMI and then the reverse distortion correction circuit 70 performing the reverse distortion correction. Therefore, the image after being subjected to the reverse distortion correction, which is the image of the image data IMRR after being subjected to the reverse distortion correction, is an image without distortion, similarly to the input image of FIG. 10, which is the image of the input image data IMI. Therefore, unlike the case of FIG. 9, the blinding error detection circuit 90 can specify the determination region in which an object such as a person or a bicycle is located with simple processing and detect the blinding error in the determination region.

5. Fourth Configuration Example

Figure 12:
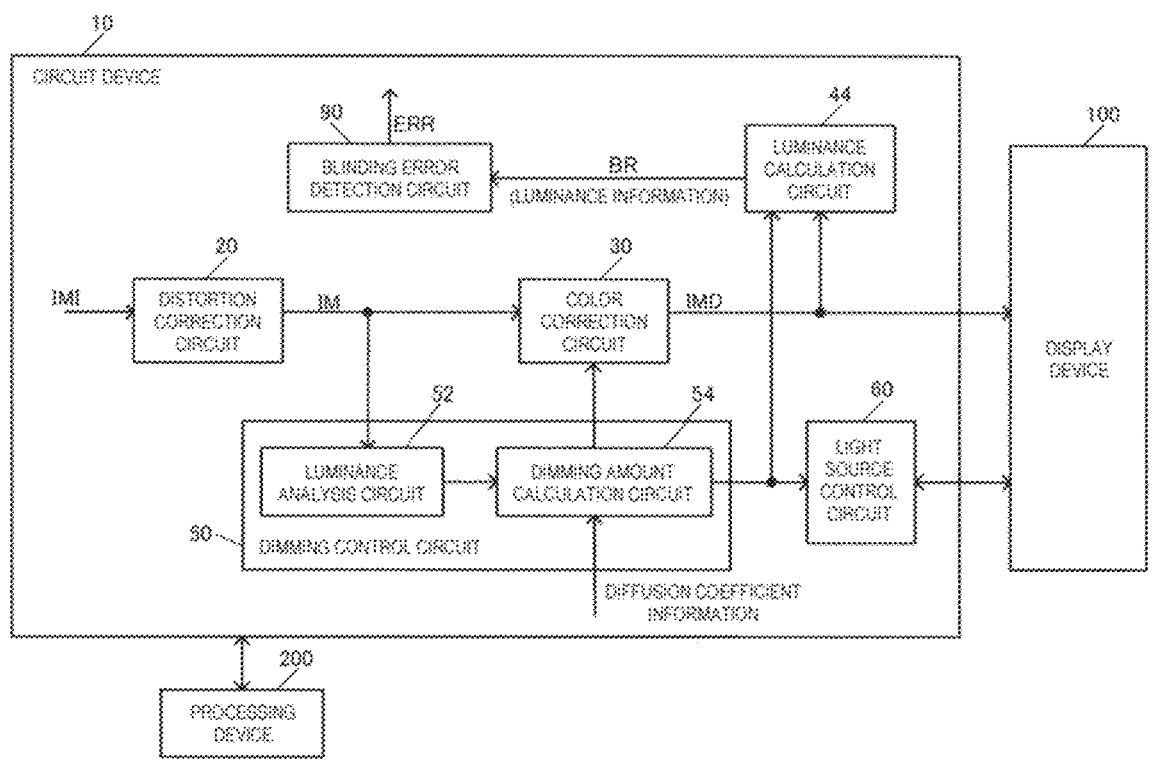
FIG. 12 shows a detailed fourth configuration example of the circuit device according to the present embodiment.

FIG. 12 shows a detailed fourth configuration example of the circuit device 10 according to the present embodiment. In the fourth configuration example, a luminance calculation circuit 44 is provided instead of the reverse color correction circuit 40 of FIG. 3. Then, the blinding error detection circuit 90 performs the blinding error detection process based on luminance information BR from the luminance calculation circuit 44. For example, the luminance calculation circuit 44 converts a luminance value of each pixel of the display image data IMD obtained by the color correction into a luminance value before being subjected to the color correction based on the result of the dimming control, and outputs the luminance value as the luminance information BR. In this manner, it is possible to implement the blinding error detection process in accordance with the display image data IMD and the result of the dimming control by a process with a small load such as the calculation of the luminance information BR.

In FIG. 3, the reverse color correction is performed on the display image data IMD obtained by the color correction, so that the image data IMR after being subjected to the reverse color correction corresponding to the image data by restoring the original image data IM is calculated, and the blinding error is detected based on the image data IMR after being subjected to the reverse color correction. However, since the blinding error can be determined by the luminance, it is not always necessary to restore the original image data IM. Therefore, in FIG. 12, the luminance calculation circuit 44 calculates the luminance information BR corresponding to the original image data IM based on the display image data IMD and the information on the dimming amount which is the result of the dimming control obtained by the dimming control circuit 50. For example, the luminance calculation circuit 44 calculates the luminance of each pixel of the display image data IMD, and converts the calculated luminance of the pixel by the same method as in FIG. 7 to generate the luminance information BR. For example, the luminance information BR is generated by performing conversion processing such that the luminance of the pixel becomes lower as the luminance value of the backlight 120 becomes lower, based on the luminance value of the backlight 120 which is the information on the dimming amount. The luminance information BR is, for example, information in which a luminance value is set for each pixel of a plurality of pixels constituting an image. Then, the blinding error detection circuit 90 obtains the above-described determination index value of the blinding error based on the luminance information BR, and compares the obtained determination index value with the threshold value to detect the blinding error. For example, based on the luminance information BR, the blinding error detection circuit 90 performs integration processing of the luminance of the plurality of pixels in the determination region, and obtains an integrated value or an average value as the determination index value. Alternatively, the blinding error detection circuit 90 obtains the number of high luminance pixels or the ratio of high luminance pixels, or the number of black pixels or the ratio of black pixels in the determination region as the determination index value based on the luminance information BR. In this manner, the luminance information BR is obtained by processing with less load than the reverse color correction, and the blinding error can be detected based on the luminance information BR.

6. Fifth Configuration Example

Figure 13:
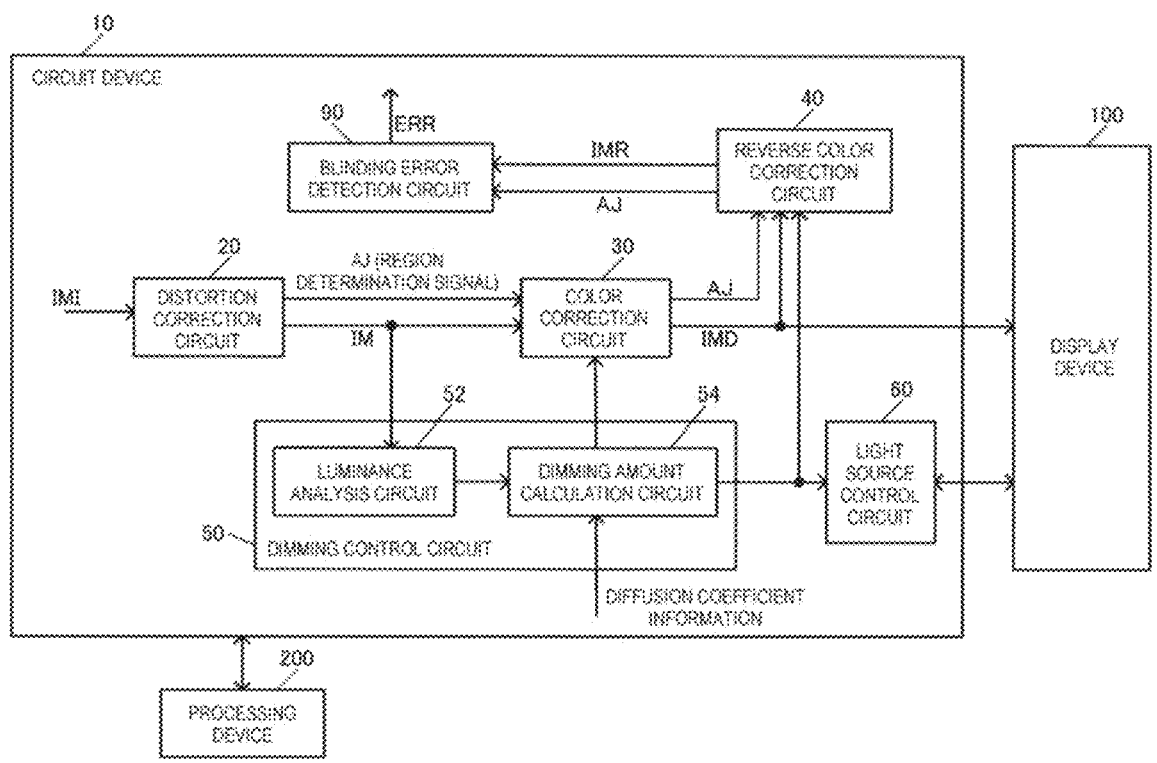
FIG. 13 shows a detailed fifth configuration example of the circuit device according to the present embodiment.

FIG. 13 shows a detailed fifth configuration example of the circuit device 10 according to the present embodiment. In the fifth configuration example, each circuit of the circuit device 10 sends the region determination signal AJ together with the image data to a subsequent circuit. For example, the distortion correction circuit 20 outputs the region determination signal AJ together with the image data IM to the color correction circuit 30, and the color correction circuit 30 outputs the region determination signal AJ together with the display image data IMD to the reverse color correction circuit 40. The reverse color correction circuit 40 outputs the region determination signal AJ to the blinding error detection circuit 90 together with the image data IMR after being subjected to the reverse color correction. For example, the region determination signal AJ is output to the subsequent circuit as region determination index data associated with each pixel data of the image data. That is, the index data for specifying the region where each pixel is located is output in association with each pixel data. In this manner, each of the color correction circuit 30, the reverse color correction circuit 40, and the blinding error detection circuit 90 can determine which region each pixel data of the image data belongs to based on the region determination signal AJ. Then, similarly to the method described with reference to FIGS. 9 and 10, the blinding error detection circuit 90 can specify the determination region where a person, a bicycle, or the like is located based on the region determination signal AJ and detect the blinding error in the determination region.

Although the first configuration example to the fifth configuration example according to the present embodiment are described above, the present embodiment is not limited thereto, and various modifications such as a configuration in which at least two configuration examples of the first configuration example to the fifth configuration example are combined are possible.

7. Head-Up Display

FIG. 14 shows a configuration example of the head-up display 190 according to the present embodiment. The head-up display 190 according to the present embodiment includes the circuit device 10 according to the present embodiment and the display device 100. The display device 100 projects the display image based on the display image data IMD from the circuit device 10. For example, the display device 100 includes the display panel 110 and the backlight 120. The display device 100 may include the display driver 140 that drives the display panel 110, and the diffusion plate 115 provided between the display panel 110 and the backlight 120. The display device 100 may include a projection optical system such as a mirror 150 that reflects projection light of a projection image.

The display driver 140 drives the data lines and the scanning lines of the display panel 110 to display the image based on the display image data IMD from the circuit device 10. The light emitted from the backlight 120 passes through the diffusion plate 115 and the display panel 110, and is reflected by the mirror 150 toward a direction of the transparent screen 160. The transparent screen 160 is, for example, a windscreen of an automobile. A reflective surface of the transparent screen 160 is, for example, a concave surface, and the projection image is a virtual image as viewed from the user. That is, when viewed from the user, the projection image appears to be formed farther than the transparent screen 160. As a result, the projection image can be displayed in the background. The configuration of the head-up display 190 is not limited to the configuration shown in FIG. 14, and various modifications can be made. For example, a display panel other than the liquid crystal display panel may be used as the display panel 110, and various modifications of the arrangement of the diffusion plate 115 and the projection optical system can be made.

As described above, the circuit device according to the present embodiment is a circuit device used in a display device of a head-up display that performs image projection using display image data and a light source. The circuit device includes a dimming control circuit configured to perform dimming control of the light source based on image data, a color correction circuit configured to perform color correction on the image data in accordance with a result of the dimming control to output the display image data, and a blinding error detection circuit configured to perform a blinding error detection process of the head-up display in accordance with the display image data and the result of the dimming control.

In this manner, it is possible to detect the blinding error reflecting the result of the dimming control performed by the dimming control circuit. Therefore, as compared with the method of detecting the blinding error using only the display image data, even when the dimming control is performed, it is possible to appropriately detect the blinding error.

In the present embodiment, the circuit device may further include a reverse color correction circuit configured to perform reverse color correction of the color correction on the display image data based on the result of the dimming control to output image data after being subjected to the reverse color correction. The blinding error detection circuit may perform the blinding error detection process based on the image data after being subjected to the reverse color correction.

Therefore, the image data after being subjected to the reverse color correction becomes image data based on the display image data and the result of the dimming control, and by detecting the blinding error based on the image data after being subjected to the reverse color correction as described above, the blinding error detection process in accordance with the display image data and the result of the dimming control can be implemented.

In the present embodiment, the circuit device may further include a distortion correction circuit configured to perform distortion correction of input image data to output the image data, and the blinding error detection circuit may perform the blinding error detection process in each of a plurality of regions obtained by dividing an image of the input image data based on a region determination signal output from the distortion correction circuit.

In this manner, it is possible to determine the determination region based on the region determination signal from the distortion correction circuit and detect the blinding error in the determination region.

In the present embodiment, the circuit device may further include a distortion correction circuit configured to perform distortion correction of input image data to output the image data, a reverse color correction circuit configured to perform reverse color correction of the color correction on the display image data based on the result of the dimming control to output image data after being subjected to the reverse color correction, and a distortion correction circuit configured to perform reverse distortion correction of the distortion correction on the image data after being subjected to the reverse color correction to output image data after being subjected to the reverse distortion correction. Then, the blinding error detection circuit may perform the blinding error detection process based on the image data after being subjected to the reverse distortion correction.

In this manner, it is possible to perform the blinding error detection process based on the image data after being subjected to the reverse distortion correction corresponding to the input image data, and it is possible to detect the blinding error by setting the determination region of the blinding error with simple processing.

In addition, in the present embodiment, the color correction circuit may perform the color correction on the image data in accordance with a luminance of the light source of the display device, and the reverse color correction circuit may perform the reverse color correction on the display image data in accordance with the luminance of the light source.

Therefore, even when the dimming control or the color correction based on the dimming control is performed, the blinding error can be appropriately detected.

In the present embodiment, the display device may further include a display panel and a backlight including a plurality of light sources, and the plurality of light sources may be provided corresponding to respective areas of a plurality of areas of the display panel. Then, the color correction circuit may perform the color correction on the image data in accordance with luminances of the light sources, and the reverse color correction circuit may perform the reverse color correction on the display image data in accordance with the luminances of the light sources.

Therefore, even when the dimming control of the backlight or the color correction based on the dimming control of the backlight is performed, the blinding error can be appropriately detected.

In the present embodiment, the circuit device may further include a luminance calculation circuit configured to convert a luminance value of each pixel of the display image data obtained by the color correction into a luminance value before being subjected to the color correction based on the result of the dimming control, and output the luminance value as luminance information. Then, the blinding error detection circuit may perform the blinding error detection process based on the luminance information.

In this manner, it is possible to implement the blinding error detection process in accordance with the display image data and the result of the dimming control by a process with a small load such as the calculation of the luminance information.

In the present embodiment, the dimming control circuit may include a luminance analysis circuit that performs luminance analysis of the image data, and a dimming amount calculation circuit that calculates a dimming amount of the light source based on the result of the luminance analysis.

In this manner, by using the dimming amount calculated based on the result of the luminance analysis of the image data, it is possible to implement the blinding error detection process in accordance with the display image data and the result of the dimming control.

In the present embodiment, the blinding error detection circuit may obtain a determination index value of the blinding error in accordance with the display image data and the result of the dimming control, and compare the determination index value with a threshold value to perform the blinding error detection process.

In this manner, by using the determination index value obtained in accordance with the display image data and the result of the dimming control, it is possible to detect the blinding error with simple processing.

The head-up display according to the present embodiment includes the circuit device described above and the display device configured to project a display image based on the display image data from the circuit device.

Although the present embodiment is described in detail as described above, it will be readily apparent to those skilled in the art that many modifications may be made without departing substantially from novel matters and effects of the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. All combinations of the present embodiment and the modifications are also in the scope of the present disclosure. Further, configurations, operations, and the like of the circuit device, the display device, the head-up display, and the like are not limited to those described in the present embodiment, and various modifications can be made.

What is claimed is:

1. A circuit device used in a display device of a head-up display that performs image projection using display image data and a light source, the circuit device comprising:
   a dimming control circuit configured to perform dimming control of the light source based on image data;
   a color correction circuit configured to perform color correction on the image data in accordance with a result of the dimming control to output the display image data; and
   a blinding error detection circuit configured to perform a blinding error detection process of the head-up display in accordance with the display image data and the result of the dimming control.

2. The circuit device according to claim 1, further comprising:
   a reverse color correction circuit configured to perform reverse color correction of the color correction on the display image data based on the result of the dimming control to output image data after being subjected to the reverse color correction, wherein
   the blinding error detection circuit performs the blinding error detection process based on the image data after being subjected to the reverse color correction.

3. The circuit device according to claim 2, further comprising:
   a distortion correction circuit configured to perform distortion correction of input image data to output the image data, wherein
   the blinding error detection circuit performs the blinding error detection process in each of a plurality of regions obtained by dividing an image of the input image data based on a region determination signal output from the distortion correction circuit.

4. The circuit device according to claim 1, further comprising:
   a distortion correction circuit configured to perform distortion correction of input image data to output the image data;
   a reverse color correction circuit configured to perform reverse color correction of the color correction on the display image data based on the result of the dimming control to output image data after being subjected to the reverse color correction; and
   a reverse distortion correction circuit configured to perform reverse distortion correction of the distortion correction on the image data after being subjected to the reverse color correction to output image data after being subjected to the reverse distortion correction, wherein
   the blinding error detection circuit performs the blinding error detection process based on the image data after being subjected to the reverse distortion correction.

5. The circuit device according to claim 2, wherein
   the color correction circuit performs the color correction on the image data in accordance with a luminance of the light source of the display device, and
   the reverse color correction circuit performs the reverse color correction on the display image data in accordance with the luminance of the light source.

6. The circuit device according to claim 2, wherein
   the display device includes a display panel and a backlight including a plurality of light sources, the plurality of light sources are provided corresponding to respective areas of a plurality of areas of the display panel, the color correction circuit performs the color correction on the image data in accordance with luminances of the light sources, and the reverse color correction circuit performs the reverse color correction on the display image data in accordance with the luminances of the light sources.

7. The circuit device according to claim 1, further comprising:

a luminance calculation circuit configured to convert a luminance value of each pixel of the display image data obtained by the color correction into a luminance value before being subjected to the color correction based on the result of the dimming control, and output the luminance value as luminance information, wherein the blinding error detection circuit performs the blinding error detection process based on the luminance information.

8. The circuit device according to claim 1, wherein the dimming control circuit includes a luminance analysis circuit that performs luminance analysis of the image data, and a dimming amount calculation circuit that calculates a dimming amount of the light source based on a result of the luminance analysis.

9. The circuit device according to claim 1, wherein the blinding error detection circuit obtains a determination index value of the blinding error in accordance with the display image data and the result of the dimming control, and compares the determination index value with a threshold value to perform the blinding error detection process.

10. A head-up display comprising:

the circuit device according to claim 1; and the display device configured to project a display image based on the display image data from the circuit device.

* * * * *